US011243844B2

United States Patent
Hung et al.

(10) Patent No.: US 11,243,844 B2
(45) Date of Patent: Feb. 8, 2022

(54) METHOD FOR ENHANCING SPEED OF INCREMENTAL BACKUP, BRIDGE DEVICE, AND STORAGE SYSTEM

(71) Applicant: JMicron Technology Corp., Hsin-Chu (TW)

(72) Inventors: Yi-Tsan Hung, Hsinchu County (TW); Ching-Chih Kuo, Hsinchu County (TW)

(73) Assignee: JMicron Technology Corp., Hsinchu County (TW)

( * ) Notice: Subject to any disclaimer, the term of this patent is extended or adjusted under 35 U.S.C. 154(b) by 143 days.

(21) Appl. No.: 16/744,114

(22) Filed: Jan. 15, 2020

(65) Prior Publication Data

US 2021/0064474 A1    Mar. 4, 2021

(30) Foreign Application Priority Data

Aug. 29, 2019  (TW) .................................. 108130948

(51) Int. Cl.
*G06F 11/14*    (2006.01)
*G06F 16/11*    (2019.01)

(52) U.S. Cl.
CPC ........ *G06F 11/1451* (2013.01); *G06F 16/128* (2019.01); *G06F 2201/80* (2013.01)

(58) Field of Classification Search
None
See application file for complete search history.

(56) References Cited

U.S. PATENT DOCUMENTS

| 5,819,020 | A | 10/1998 | Beeler, Jr. |
| 6,421,711 | B1 | 7/2002 | Blumenau |
| 2007/0299891 | A1* | 12/2007 | Jopp ................... G06F 11/1461 |
| 2013/0075566 | A1* | 3/2013 | Grant .................... G06F 1/1632 |
| | | | 248/346.03 |
| 2015/0143063 | A1 | 5/2015 | Mutalik |
| 2018/0173454 | A1 | 6/2018 | Dornemann |

* cited by examiner

*Primary Examiner* — Belix M Ortiz Ditren
(74) *Attorney, Agent, or Firm* — Winston Hsu (57) ABSTRACT

A method for enhancing speed of incremental backup, a bridge device, and a storage system are provided. The method includes: regarding a predetermined location within the storage system, determining whether a record file exists; in response to the record file existing, determining whether any file needing to be compared exists; in response to said any file needing to be compared existing, comparing said any file needing to be compared with content of the record file to generate at least one comparison result, wherein said at least one comparison result indicates whether a set of attributes of said any file needing to be compared completely exist in the record file; according to said at least one comparison result, determining whether any difference is found; and in response to said any difference being not found, preventing triggering any backup from a source storage device to a target storage device.

5 Claims, 6 Drawing Sheets

METHOD FOR ENHANCING SPEED OF INCREMENTAL BACKUP, BRIDGE DEVICE, AND STORAGE SYSTEM

BACKGROUND OF THE INVENTION

1. Field of the Invention

The invention relates to data protection, more particularly to methods for enhancing speed of incremental backup and the associated bridge device and storage system.

2. Description of the Prior Art

According to the related art, a conventional storage system may scan all files in a target device to compare with the files in a source device, in order to know which files in the source device need to be backed up, which may cause some problems. For example, when the number of files is very large, the conventional storage system may be forced to spend a lot of time on scanning all the files in the target device. As a result, the overall performance of the conventional storage system is degraded. Therefore, a novel method and related architecture are required to improve the overall performance of the storage system without side effects or in a way that is less likely to introduce a side effect.

SUMMARY OF THE INVENTION

It is an objective of the present invention to provide a method for enhancing speed of incremental backup and the associated bridge device and storage system, in order to solve the above problems.

It is another objective of the present invention to provide a method for enhancing speed of incremental backup and the associated bridge device and storage system, in order to improve the overall performance of the storage system without side effects or in a way that is less likely to introduce a side effect.

At least one embodiment of the present invention provides a method for enhancing speed of incremental backup. The method is applicable to a storage system which comprising a source storage device and a target storage device. The incremental backup is a backup from the source storage device to the target storage device. The method comprises: regarding a predetermined location within the storage system, determining whether a record file exists, wherein the record file is used to record information regarding files of the source storage device; during an accelerated incremental backup management procedure, in response to the record file existing, determining whether any file needing to be compared exists, wherein said any file needing to be compared represents at least one file requested by a host device to be written to the source storage device; during the accelerated incremental backup management procedure, in response to said any file needing to be compared existing, comparing said any file needing to be compared with content of the record file to generate at least one comparison result, wherein said at least one comparison result indicates whether a set of attributes of said any file needing to be compared completely exist in the record file; during the accelerated incremental backup management procedure, determining whether any difference is found according to said at least one comparison result, wherein it is determined that said any difference is not found if said at least one comparison result indicates that the set of attributes of said any file needing to be compared completely exist in the record file, otherwise, it is determined that said any difference is found; and during the accelerated incremental backup management procedure, in response to said any difference being not found, preventing triggering any backup from the source storage device to the target storage device.

At least one embodiment of the present invention provides a bridge device applicable to a storage system which comprising a source storage device and a target storage device comprises: at least one interface circuit; and a processing circuit coupled to said at least one interface circuit. Said at least one interface circuit is arranged to couple a host device, the source storage device and the target storage device to the bridge device. In addition, the processing circuit is arranged to control operations of the bridge device for allowing the host device to access the source storage device via the bridge device, perform incremental backup to backup from the source storage device to the target storage device and speed up the incremental backup. For example, regarding a predetermined location within the storage system, the bridge device is arranged to determine whether a record file exists, wherein the record file is used to record information regarding files of the source storage device; during an accelerated incremental backup management procedure, in response to the record file existing, the bridge device is arranged to determine whether any file needing to be compared exists, wherein said any file needing to be compared represents at least one file requested by the host device to be written to the source storage device; during the accelerated incremental backup management procedure, in response to said any file needing to be compared existing, the bridge device is arranged to compare said any file needing to be compared with content of the record file to generate at least one comparison result, wherein said at least one comparison result indicates whether a set of attributes of said any file needing to be compared completely exist in the record file; during the accelerated incremental backup management procedure, the bridge device is arranged to determine whether any difference is found according to said at least one comparison result, wherein it is determined that said any difference is not found if said at least one comparison result indicates that the set of attributes of said any file needing to be compared completely exist in the record file, otherwise, it is determined that said any difference is found; and during the accelerated incremental backup management procedure, in response to said any difference being not found, the bridge device is arranged to prevent triggering any backup from the source storage device to the target storage device.

According to some embodiments, the present invention also provides storage system that comprises the bridge device, wherein the storage system further comprises at least one holder for installing the source storage device and the target storage device.

One of the advantages of the present invention is that by properly managing the file information records, operations of the incremental backup can be properly controlled to effectively reduce the number of comparing operations. Especially, the time required for performing the incremental backup can be reduced, accordingly, and the overall performance of storage system can be greatly improved in a situation where there are limited hardware resources. In addition, implementation according to the related embodiments of the present invention does not increase too many additional costs. Therefore, the problems of the related art can be solved. Compared with the related art, the present invention can achieve the optimized performance of the electronic device without side effects or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
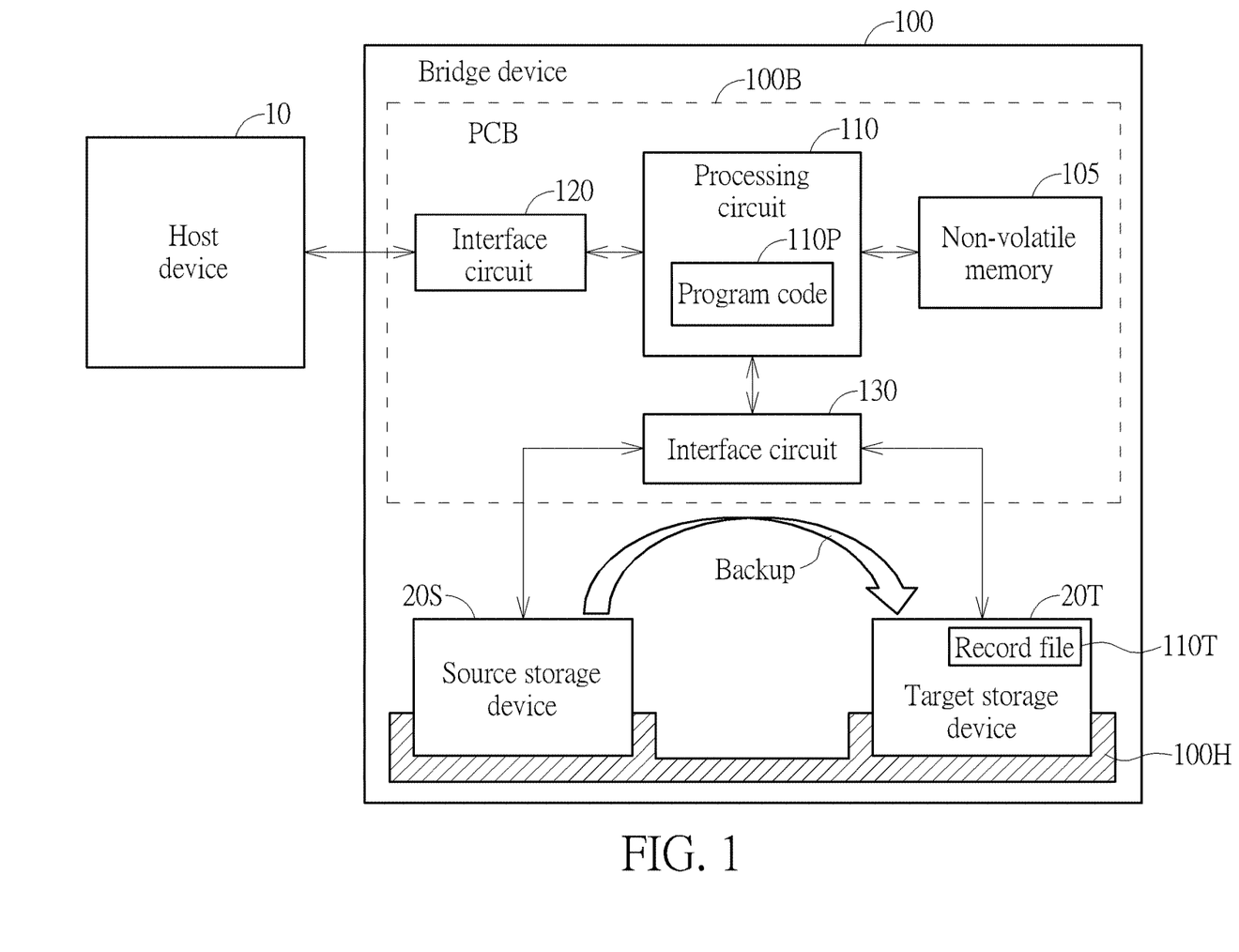
FIG. 1 is a diagram of a storage system according to an embodiment of the present invention.

FIG. 1 is a diagram of a storage system according to an embodiment of the present invention. For better comprehension, a host device 10 is coupled to the storage system shown at the right side in FIG. 1, but the present invention is not limited thereto. The storage system may comprise a plurality of storage devices such as a source storage device 20S and a target storage device 20T. Examples of the target storage device 20T may include, but are not limited to: the Hard Disk Drive (HDD) and the Solid State Drive (SSD). Examples of the source storage device 20S may include, but are not limited to: the HDD, the SSD, the memory card such as the Secure Digital (SD) memory card and the Universal Serial Bus (USB) mass storage device such as an external HDD, a card reader and a flash drive. Examples of the host device 10 may include, but are not limited to: the multi-functional mobile phone, the tablet and the Personal Computer (PC), such as the desktop computer and the laptop computer.

Besides the source storage device 20S and the target storage device 20T, the storage system may further comprise a bridge device 100. The bridge device 100 may comprise a non-volatile memory 105, a processing circuit 110 and at least one interface circuit (e.g. one or more interface circuits), such as interface circuits 120 and 130, wherein these devices may be coupled to each other. As shown in FIG. 1, the non-volatile memory 105, the processing circuit 110 and the interface circuits 120 and 130 may be configured on a printed circuit board (PCB) 100B in the bridge device 100. In addition, the storage system (especially, the bridge device of the present invention, such as the bridge device 100) may further comprise at least one holder (e.g. one or more holders), such as the holder 100H for installing the plurality of storage devices such as the source storage 20S device and the target storage device 20H, and preferably, the bridge device 100 may further comprise a case, so that the above-mentioned components of the bridge device 100 and the plurality of storage devices are hidden therein, but the invention is not limited thereto. For example, the non-volatile memory 105 may be implemented by means of an Electrically Erasable Programmable Read-Only Memory (EEPROM), a flash memory, etc. The processing circuit 110 may be implemented by means of at least one processor (e.g. one or more processors), a memory device (e.g. the Random Access Memory (RAM)) and the bus. The interface circuit 130 may be implemented by means of a storage interface circuit operating in compliance with at least one communication standard (e.g. the Serial Advanced Technology Attachment (SATA) standard, the Peripheral Component Interconnect Express (PCIe) standard, USB standard, etc.). The interface circuit 120 may be implemented by means of a transmission interface circuit operating in compliance with a specific communication standard (e.g. the USB standard, the external SATA (eSATA) standard, etc.), a wired or wireless network interface circuit, or others.

According to an embodiment of the invention, the aforementioned at least one interface circuit, such as the interface circuits 120 and 130, may be arranged to couple the host device 10, the source storage device 20S and the target storage device 20T to the bridge device 100. In addition, the non-volatile memory 105 may be arranged to store predetermined program information representing the program code 110P for being loaded into the processing circuit 110 to become the program code 110P running on the processing circuit 110. The processing circuit 110 (e.g. the program code 110P running on the processing circuit 110) may control operations of the bridge device 100 for allowing the host device 10 to access (e.g. read or write) the source storage device 20S via the bridge device 100 and perform backup to backup file(s) from the source storage device 20S to the target storage device 20T, wherein the aforementioned backup may be a full backup or an incremental backup, and the incremental backup may represent the backup of new or modified data after the last backup (for example, the full backup or the incremental backup).

Figure 2:
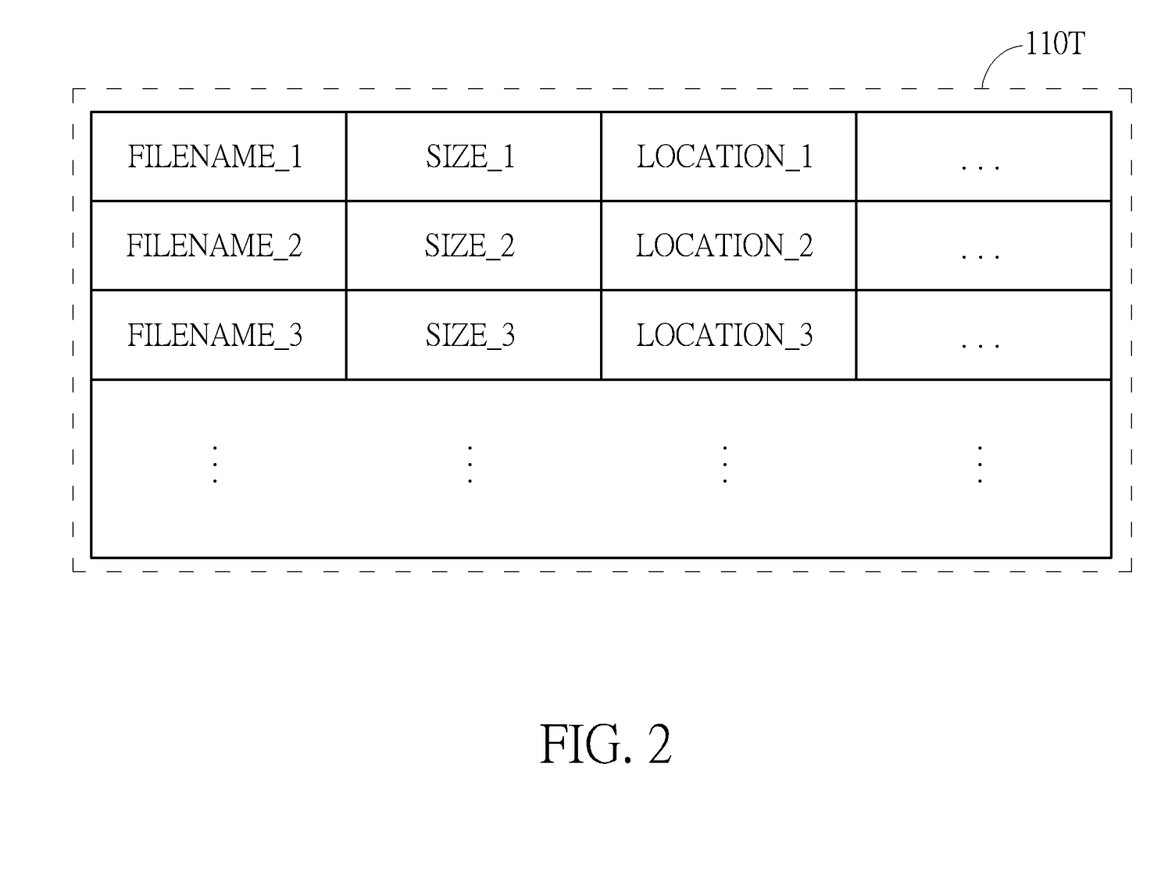
FIG. 2 shows a series of file information records of the storage system as shown in FIG. 1 in one embodiment of the present invention.

FIG. 2 shows a series of file information records of the storage system as shown in FIG. 1 in one embodiment of the present invention. The series of file information records may comprise a plurality of sets of attributes regarding the file system of the source storage device 20S, such as the respective attributes of the files (such as File #1, File #2, File #3, etc.) of the source storage device 20S. The attributes may be, for example: a set of attribute of File #1, such as the file name FILENAME_1, the size SIZE_1, the storing location LOCATION_1, the modified date and time, etc. of the File #1; a set of attribute of File #2, such as the file name FILENAME_2, the size SIZE_2, the storing location LOCATION_2, the modified date and time, etc. of the File #2; a set of attribute of File #3, such as the file name FILENAME_3, the size SIZE_3, the storing location LOCATION_3, the modified date and time, etc. of the File #3; and so on.

The bridge device 100 may store the series of file information records in a record file 110T, and may update the series of file information records according to the latest status of all files (for example, the normal files and directories) in the file system of the source storage device 20S. The record file 110T may be stored in a predetermined location within the storage system, such as in the target storage device 20T, especially, a predetermined path in the file system of the target storage device 20T. In some embodiments of the invention, the predetermined location may be changed, especially; it may be located in other location (for example, in another storage device of the plurality of storage devices, or in a predetermined storage area of another non-volatile memory) in the storage system.

Figure 3:
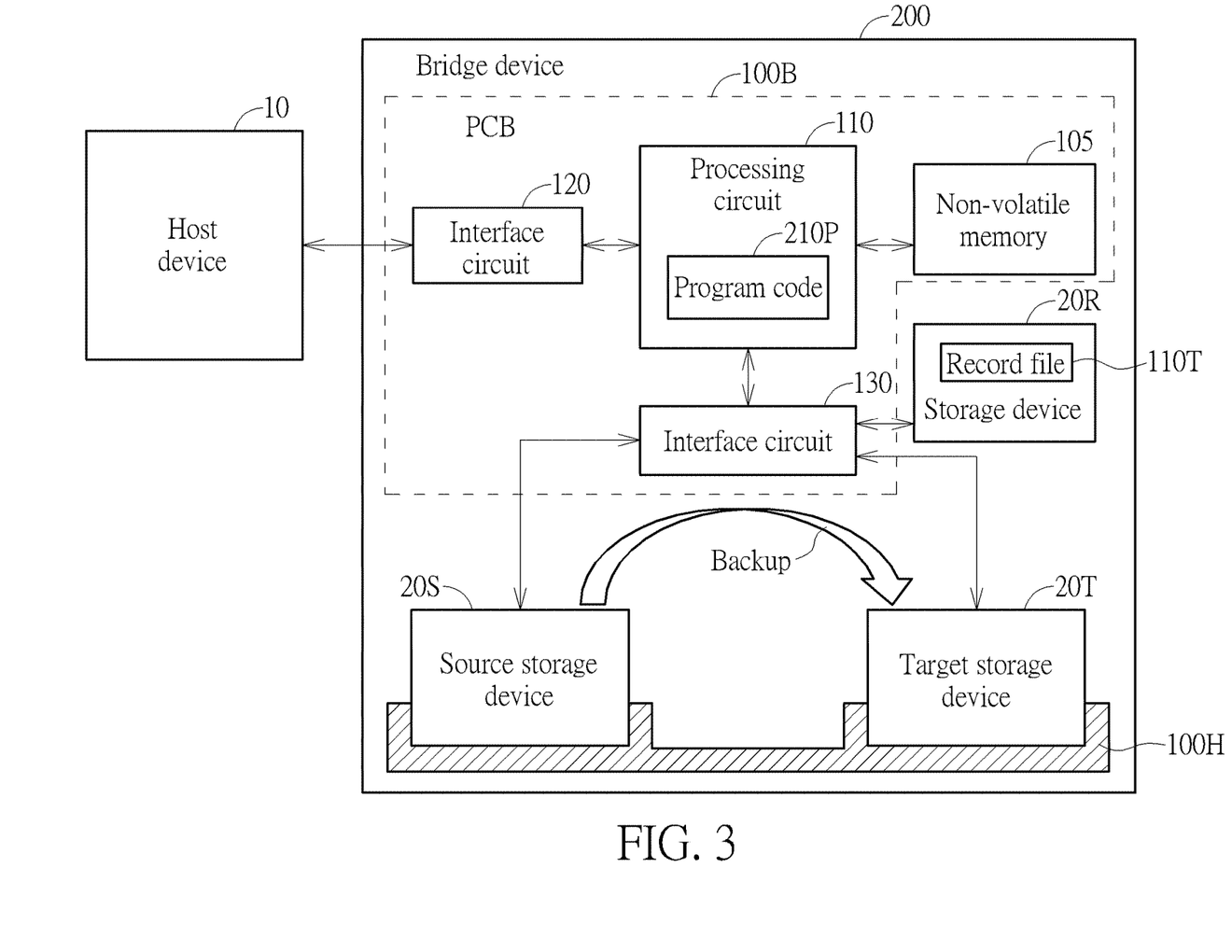
FIG. 3 is a diagram of a storage system according to another embodiment of the present invention.

FIG. 3 is a diagram of a storage system according to another embodiment of the present invention. Compared to the architecture shown in FIG. 1, the storage system may comprise a storage device 20R (e.g. HDD, SDD, or others) and may be utilized as an example of the aforementioned another storage device, wherein the program code 110P may be accordingly changed to the program code 210P so that the predetermined location is changed to the storage device 20R, especially, some path in the file system of the storage device 20R. In response to the change in the architecture, the symbol "100" of the bridge device 100 is replaced with the symbol "200" in this embodiment. The content similar to the previous embodiment in this embodiment is not repeated here for brevity.

Figure 4:
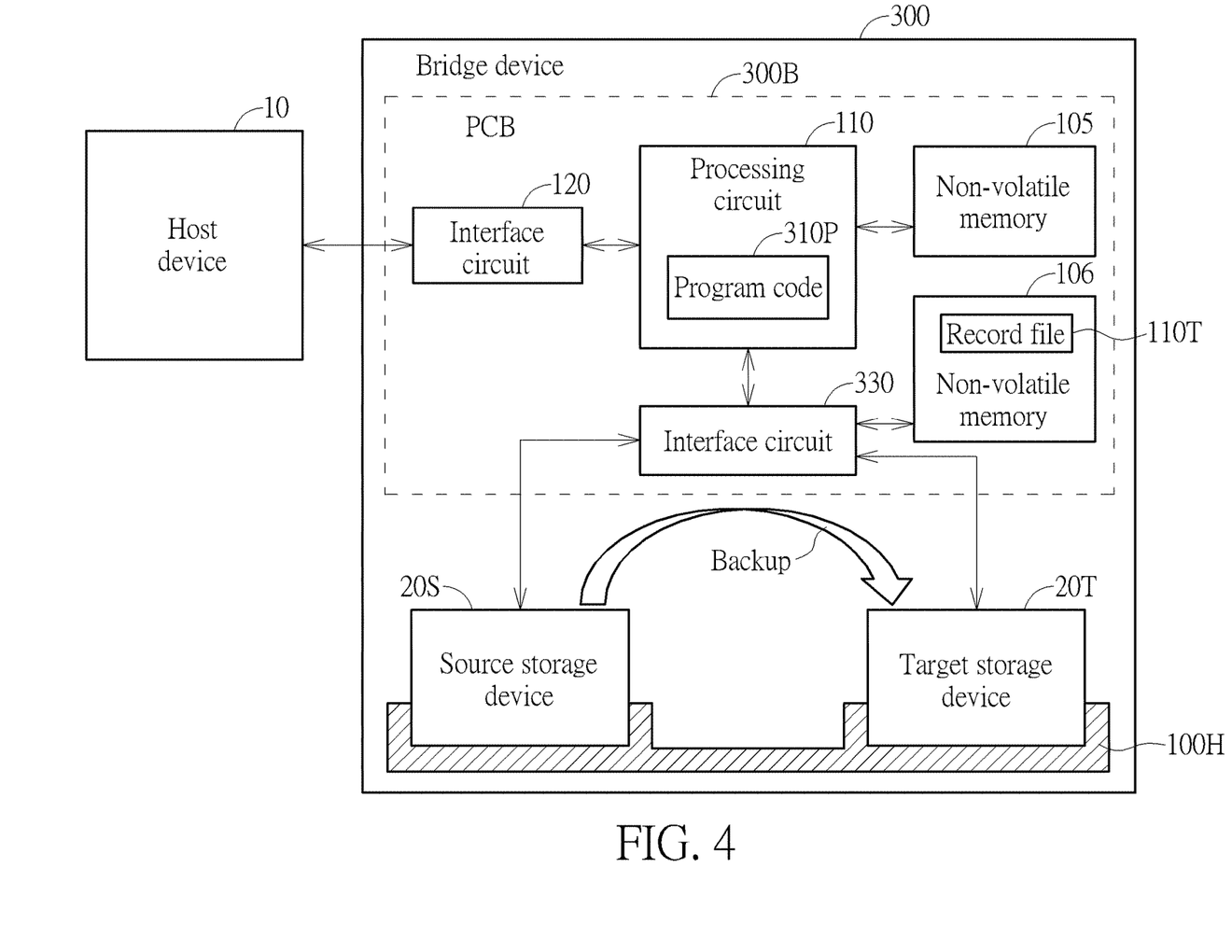
FIG. 4 is a diagram of a storage system according to yet another embodiment of the present invention.

FIG. 4 is a diagram of a storage system according to yet another embodiment of the present invention. Compared to the architecture shown in FIG. 1, the storage system may comprise a non-volatile memory 106 (e.g. a flash memory) and may be utilized as an example of the aforementioned another non-volatile memory, wherein the program code 110P may be accordingly changed to the program code 310P so that the predetermined location is changed to the non-volatile memory 106, especially, some storage area in the non-volatile memory 106. In response to the change in the architecture, the symbols "100", "100B" and "130" of the bridge device 100, the PCB 100B and the interface circuit 130 are respectively replaced with the symbols "300", "300B" and "330" in this embodiment. The content similar to the previous embodiment in this embodiment is not repeated here for brevity.

Figure 5:
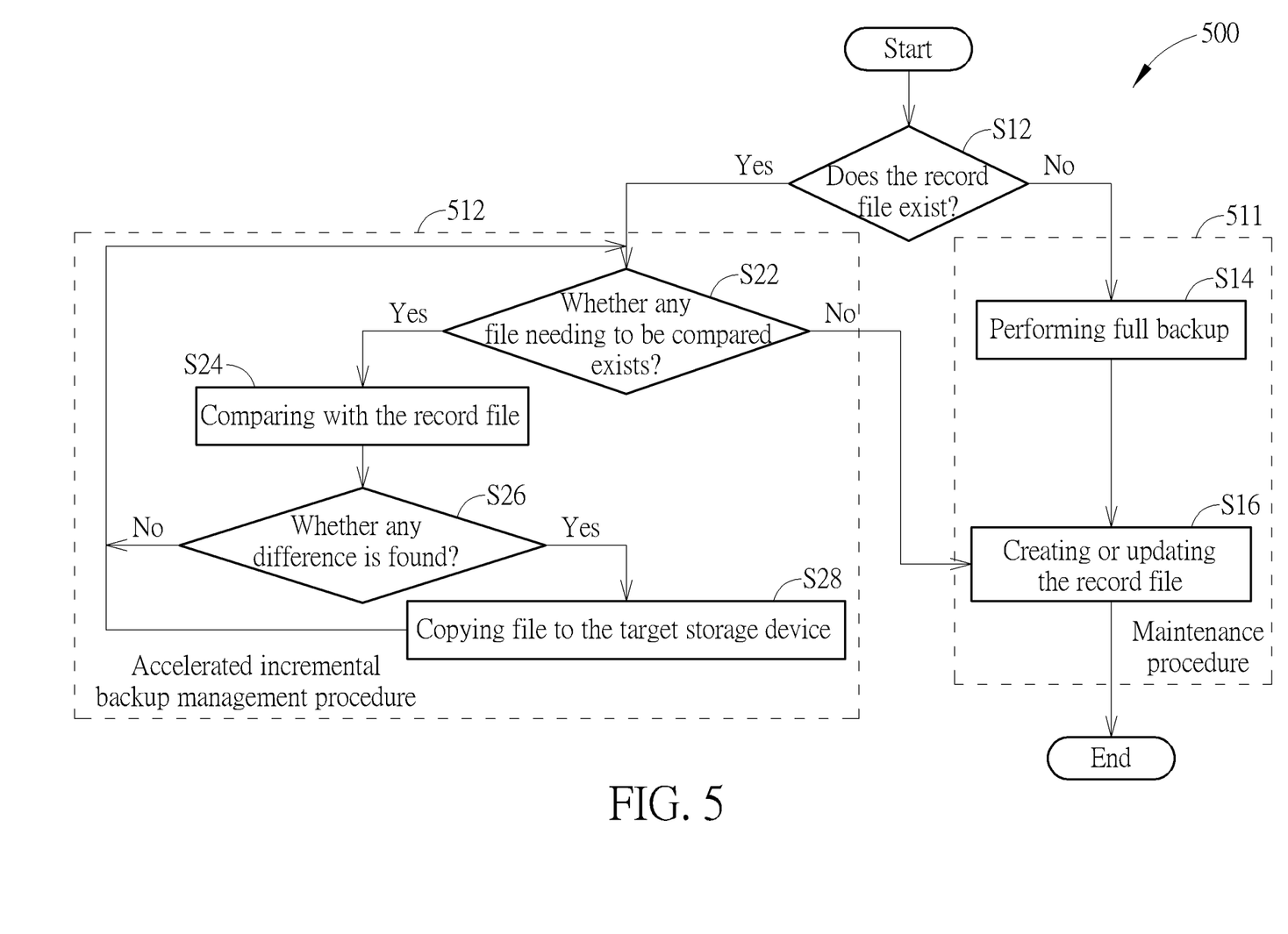
FIG. 5 illustrates a flowchart of a method for enhancing speed of incremental backup according to an embodiment of the present invention.

FIG. 5 illustrates a flow chart of a method for enhancing speed of incremental backup according to an embodiment of the present invention. The incremental backup is a backup from the source storage device 20S to the target storage device 20T. The method is applicable to the aforementioned storage system and bridge device of the present invention such as the bridge devices 100, 200 and 300, and may be implemented via the corresponding program code, such as the program codes 110P, 210P and 310P, running on the processing circuit 110. Based on the proposed architecture, such as the architectures shown in FIG. 1, FIG. 3 and FIG. 4 and under the control of the processing circuit 110 running the corresponding program code, the bridge device of the present invention is capable of enhancing speed of the incremental backup. In the following paragraphs, the bridge device 100 is taken as an example of the bridge device of the present invention for illustrating the proposed method.

In step S12, regarding the predetermined location within the storage system, the bridge device 100 is arranged to determine whether a record file 110T exists, wherein the record file 110T is used to record information regarding files of the source storage device 20S. If yes, step S22 is entered; if no, step S14 is entered. According to this embodiment, the working flow 500 as shown in FIG. 5 may comprise a maintenance procedure 511 and an accelerated incremental backup management procedure 512. Steps S14-S16 and steps S22-S28 may be performed in the maintenance procedure 511 and the accelerated incremental backup management procedure 512, respectively. In the working flow 500, any determination operation of respective determination operations of some steps may be performed multiple times to generate multiple determination results, to make some subsequent steps be performed accordingly.

In step S14, in response to the case that the record file 110T does not exist, the bridge device 110 is arranged to perform full backup from the source storage device 20S to the target storage device 20T.

In step S16, the bridge device 110 is arranged to create or update the record file 110T. For example, after performing the full backup from the source storage device 20S to the target storage device 20T (step S14), the bridge device 110 is arranged to create the record file 110T in the predetermined location to record the content of the record file 110T, such as the series of file information records. When creating the record file 110T in the predetermined location to record the aforementioned content, the bridge device 100 may be is arranged to record a set of attributes of any file copied from the source storage device 20S to the target storage device 20T during the full backup in the record file 110T to generate the aforementioned content. For another example, after performing the accelerated incremental backup management procedure 512, in response to the determination result "no" in step S22, the bridge device 100 is arranged to update the record file 110T. After the record file 110T has been updated, the aforementioned content of the record file 110T may comprise at least one set (e.g. one or more sets) of attributes of at least one file (e.g. one or more files) copied from the source storage device 20S to the target storage device 20T during the accelerated incremental backup management procedure 512.

In step S22, in response to the existence of the record file 110T, the bridge device 100 is arranged to determine whether any file needing to be compared exists. If yes, step S24 is entered; if no, step S16 is entered. According to this embodiment, the aforementioned any file needing to be compared represents at least one file (e.g. one or more files) requested by the host device 10 to be written to the source storage device 20S. For example, the aforementioned at least one file may comprise files File #1, File #2 and File #3. Suppose that the respective attributes of the files File #1-File #3 have already been recorded in the record file 110T as shown in FIG. 2, in this case, the bridge device 100 may perform the determination and/or the processing with respect to the files File #1-File #3 one after one during the accelerated incremental backup management procedure 512. For example, the bridge device 100 may perform the loop comprising steps S22-S26 one or multiple times, and/or the loop comprising steps S22-S28 one or multiple times.

In step S24, in response to the existence of the aforementioned any file needing to be compared, the bridge device 100 is arranged to compare the aforementioned any file needing to be compared (e.g. one file of the files File #1-File #3) with the aforementioned content (e.g. the series of file information records) of the record file 110T to generate at least one comparison result, wherein this at least one comparison result indicates whether a set of attributes of the aforementioned any file needing to be compared completely exist in the record file 110T.

In step S26, the bridge device 100 is arranged to determine whether any difference is found according to the aforementioned at least one comparison result. If yes, step S28 is entered; if no, step S22 is entered. According to this embodiment, it is determined by the bridge device 100 that said any difference is not found if the aforementioned at least one comparison result indicates that the set of attributes of the aforementioned any file needing to be compared completely exist in the record file 110T, otherwise, it is determined by the bridge device 100 that the aforementioned any difference is found.

As shown in FIG. 5, in response to the aforementioned any difference being not found (e.g. the determination result "no" in step S26), the bridge device 100 is arranged to prevent triggering any backup from the source storage device 20S to the target storage device 20T. That is, any backup from the source storage device 20S to the target storage device 20T is prevented from being triggered in response to no difference being found. For better comprehension, suppose that in the source storage device 20S, the files File #1 and File #2 have not been updated and File #3 has been updated. Therefore, for File #1, the determination result in step S26 would be "no" (for example, the set of attributes of File #1 completely exist in the record file 110T, especially, equal to the attributes recorded in record file 110T). Therefore, the bridge device 100 may perform the loop comprising steps S22-S26 when entering and performing the step S22 for the first time. For File #2, the determination result in step S26 would be "no" (for example, the set of attributes of File #2 completely exist in the record file 110T, especially, equal to the attributes recorded in record file 110T). Therefore, the bridge device 100 may perform the loop comprising S22-S26 when entering and performing the step S22 for the second time. For File #3, the determination result in step S26 would be "yes" (for example, the set of attributes of File #3 do not completely exist in the record file 110T, especially, the latest modified date and time of File #3 being different from the old modified date and time recorded in record file 110T). Therefore, the bridge device 100 may perform the loop comprising S22-S28 when entering and performing the step S22 for the third time.

In step S28, in response to the aforementioned any difference being found, the bridge device 100 is arranged to copy a certain file (especially, the file compared in the aforementioned step S26, such as File #3) from the source storage device 20S to the target storage device 20T (shown as "copying file to the target storage device" in FIG. 5 for brevity), wherein the aforementioned at least one file requested by the host device 10 to be written to the source storage device 20S comprises this file. Suppose that a new file is added in the source storage device 20S, for this new file, the determination result in step S26 would be "yes" (for example, the set of attributes of this new file do not completely exist in the record file 110T, especially, the set of attributes of this new file do not exist in record file 110T). Therefore, the bridge device 100 may perform the loop comprising S22-S28 when entering and performing the step S22 for another time. In this manner, the bridge device 100 may backup this new file in step S28. According to this embodiment, it is not necessary to back up the file that has been deleted. For example, when the host device 10 has deleted a file in the source storage device 20S, the bridge device 100 may directly clear the set of attribute of this file from the record file 110T.

In this embodiment, the bridge device 100 may be an example of the bridge device of the present invention, but the invention should not be limited thereto. For example, each of the bridge devices 200 and 300 may perform the operations in the working flow 500.

For better comprehension, the proposed method may be illustrated with the working flow 500 shown in FIG. 5, but the invention should not be limited thereto. According to some embodiments of the invention, one or more steps may be added, deleted, or changed in in the working flow 500.

Figure 6:
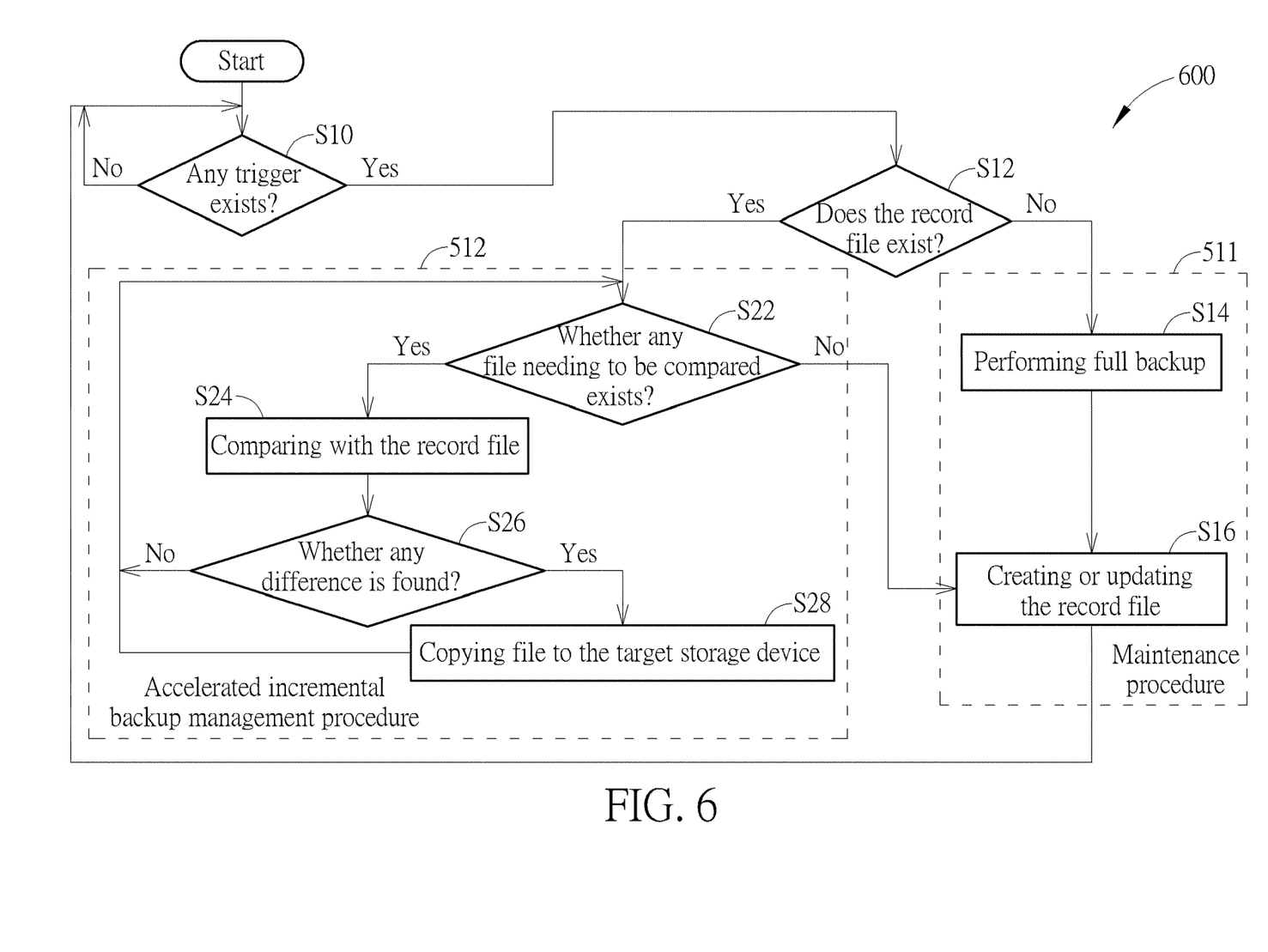
FIG. 6 illustrates a working flow of the method as shown in FIG. 5 according to another embodiment of the present invention.

FIG. 6 illustrates a working flow 600 of the method as shown in FIG. 5 according to another embodiment of the present invention, wherein the working flow 600 can be illustrated by modifying the working flow 500 shown in FIG. 5. For example, steps S12-S28 in the main flow may be the same, step S10 is added in this embodiment and some portion of the working flow is accordingly modified.

In step S10, the bridge device 100 is arranged to determine whether any trigger, such as the trigger from a triggering signal, regarding the main flow exists. If yes, the step S12 is entered; if no, the step S10 is entered to keep waiting for the aforementioned trigger. For example, the case may comprise a button (such as a hardware button) coupled to the processing circuit 110 for changing the logical state or the voltage level of the triggering signal to generate such trigger. The user may press the button to trigger the main flow. For another example, an external device (such as a multifunctional mobile phone) may perform wireless communication (especially, via the interface circuit 120) with the bridge device 100 to change the logical state or the voltage level of the triggering signal to generate such trigger. The user may use the external device to control the bridge device 100 (e.g. the processing circuit 110) to trigger the main flow, wherein the wireless communication is incompliance with the Institute of Electrical and Electronics Engineers (IEEE) 802.11 standard.

In this embodiment, the bridge device 100 may be an example of the bridge device of the present invention, but the invention should not be limited thereto. For example, each of the bridge devices 200 and 300 may perform the operations in the working flow 600. The content similar to the previous embodiment in this embodiment is not repeated here for brevity.

According to some embodiments of the invention, at least a portion (e.g. a portion or all) of the plurality of storage devices may be installed outside of the case and may be coupled to the interface circuit (e.g. the interface circuit 130 or 330) via one or more ports configured on the case, and the aforementioned at least one holder may be an optional component. The content similar to the previous embodiments in these embodiments is not repeated here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enhancing speed of incremental backup, the method being applicable to a storage system, the storage system comprising a source storage device and a target storage device, the incremental backup belonging to backup from the source storage device to the target storage device, the method comprising:

regarding a predetermined location within the storage system, determining whether a record file exists, wherein the record file is used for recording information regarding files of the source storage device;

during an accelerated incremental backup management procedure, in response to the record file existing, determining whether any file needing to be compared exists, wherein said any file needing to be compared represents at least one file requested by a host device to be written to the source storage device;

during the accelerated incremental backup management procedure, comparing said any file needing to be compared with content of the record file in response to existing of said any file needing to be compared to generate at least one comparison result, wherein said at least one comparison result indicates whether a set of attributes of said any file needing to be compared completely exist in the record file;

during the accelerated incremental backup management procedure, determining whether any difference is found according to said at least one comparison result, wherein it is determined that no difference is found if said at least one comparison result indicates that the set of attributes of said any file needing to be compared completely exist in the record file, otherwise, it is determined that said any difference is found; and during the accelerated incremental backup management procedure, preventing triggering any backup from the source storage device to the target storage device in response to said no difference is found;

wherein the step of determining whether said any file needing to be compared exists is performed multiple times to generate a third determination result and a fourth determination result, wherein the third determination result indicates that said any file needing to be compared exists, and the fourth determination result indicates that said any file needing to be compared does not exist; the step of comparing said any file needing to be compared with content of the record file to generate at least one comparison result is performed in response to the third determination result; and the method further comprises:

in response to the fourth determination result, updating the record file, wherein after the record file has been updated, the content of the record file comprises at least one set of attributes of at least one file copied from the source storage device to the target storage device during the accelerated incremental backup management procedure.

2. A method for enhancing speed of incremental backup, the method being applicable to a storage system, the storage system comprising a source storage device and a target storage device, the incremental backup belonging to backup from the source storage device to the target storage device, the method comprising:

regarding a predetermined location within the storage system, determining whether a record file exists, wherein the record file is used for recording information regarding files of the source storage device;

during an accelerated incremental backup management procedure, in response to the record file existing, determining whether any file needing to be compared exists, wherein said any file needing to be compared represents at least one file requested by a host device to be written to the source storage device;

during the accelerated incremental backup management procedure, comparing said any file needing to be compared with content of the record file in response to existing of said any file needing to be compared to generate at least one comparison result, wherein said at least one comparison result indicates whether a set of attributes of said any file needing to be compared completely exist in the record file;

during the accelerated incremental backup management procedure, determining whether any difference is found according to said at least one comparison result, wherein it is determined that no difference is found if said at least one comparison result indicates that the set of attributes of said any file needing to be compared completely exist in the record file, otherwise, it is determined that said any difference is found; and during the accelerated incremental backup management procedure, preventing triggering any backup from the source storage device to the target storage device in response to said no difference is found;

wherein the step of determining whether said any difference is found according to said at least one comparison result is performed multiple times to generate a fifth determination result and a sixth determination result, wherein the fifth determination result indicates that said any difference is not found, and the sixth determination result indicates that said any difference is found; the step of preventing triggering said any backup from the source storage device to the target storage device is performed in response to the fifth determination result; and the method further comprises:

during the accelerated incremental backup management procedure, copying a first file from the source storage device to the target storage device in response to the sixth determination result, wherein said at least one file requested by the host device to be written to the source storage device comprises the first file.

3. A bridge device, the bridge device being applicable to a storage system, the storage system comprising a source storage device and a target storage device, the bridge device comprising:

at least one interface circuit, arranged to couple a host device, the source storage device and the target storage device to the bridge device; and a processing circuit, coupled to said at least one interface circuit and arranged to control operations of the bridge device for allowing the host device to access the source storage device via the bridge device, perform incremental backup to backup from the source storage device to the target storage device and speed up the incremental backup, wherein:

regarding a predetermined location within the storage system, the bridge device is arranged to determine whether a record file exists, wherein the record file is used to record information regarding files of the source storage device;

during an accelerated incremental backup management procedure, in response to the record file existing, the bridge device is arranged to determine whether any file needing to be compared exists, wherein said any file needing to be compared represents at least one file requested by the host device to be written to the source storage device;

during the accelerated incremental backup management procedure, in response to said any file needing to be compared existing, the bridge device is arranged to compare said any file needing to be compared with content of the record file to generate at least one comparison result, wherein said at least one comparison result indicates whether a set of attributes of said any file needing to be compared completely exist in the record file;

during the accelerated incremental backup management procedure, the bridge device is arranged to determine whether any difference is found according to said at least one comparison result, wherein it is determined that said any difference is not found if said at least one comparison result indicates that the set of attributes of said any file needing to be compared completely exist in the record file, otherwise, it is determined that said any difference is found; and during the accelerated incremental backup management procedure, in response to said any difference being not found, the bridge device is arranged to prevent triggering any backup from the source storage device to the target storage device;

wherein the determination of whether said any file needing to be compared exists is performed multiple times to generate a third determination result and a fourth determination result, wherein the third determination result indicates that said any file needing to be compared exists, and the fourth determination result indicates that said any file needing to be compared does not exist; the comparison of said any file needing to be compared with the content of the record file is performed in response to the third determination result; and in response to the fourth determination result, the bridge device is arranged to update the record file, wherein after the record file has been updated, the content of the record file comprises at least one set of attributes of at least one file copied from the source storage device to the target storage device during the accelerated incremental backup management procedure.

4. A bridge device, the bridge device being applicable to a storage system, the storage system comprising a source storage device and a target storage device, the bridge device comprising:
  at least one interface circuit, arranged to couple a host device, the source storage device and the target storage device to the bridge device; and
  a processing circuit, coupled to said at least one interface circuit and arranged to control operations of the bridge device for allowing the host device to access the source storage device via the bridge device, perform incremental backup to backup from the source storage device to the target storage device and speed up the incremental backup, wherein:
    regarding a predetermined location within the storage system, the bridge device is arranged to determine whether a record file exists, wherein the record file is used to record information regarding files of the source storage device;
    during an accelerated incremental backup management procedure, in response to the record file existing, the bridge device is arranged to determine whether any file needing to be compared exists, wherein said any file needing to be compared represents at least one file requested by the host device to be written to the source storage device;
    during the accelerated incremental backup management procedure, in response to said any file needing to be compared existing, the bridge device is arranged to compare said any file needing to be compared with content of the record file to generate at least one comparison result, wherein said at least one comparison result indicates whether a set of attributes of said any file needing to be compared completely exist in the record file;
    during the accelerated incremental backup management procedure, the bridge device is arranged to determine whether any difference is found according to said at least one comparison result, wherein it is determined that said any difference is not found if said at least one comparison result indicates that the set of attributes of said any file needing to be compared completely exist in the record file, otherwise, it is determined that said any difference is found; and
    during the accelerated incremental backup management procedure, in response to said any difference being not found, the bridge device is arranged to prevent triggering any backup from the source storage device to the target storage device;
  wherein the determination of whether said any difference is found according to said at least one comparison result is performed multiple times to generate a fifth determination result and a sixth determination result, wherein the fifth determination result indicates that said any difference is not found, and the sixth determination result indicates that said any difference is found; the prevention of triggering said any backup from the source storage device to the target storage device is performed in response to the fifth determination result; and during the accelerated incremental backup management procedure, in response to the sixth determination result, the bridge device is arranged to copy a first file from the source storage device to the target storage device, wherein said at least one file requested by the host device to be written to the source storage device comprises the first file.

5. A storage system comprising the bridge device of claim 4, wherein the storage system further comprises at least one holder for installing the source storage device and the target storage device.

* * * * *